United States Patent [19]

Mimura et al.

[11] Patent Number: 5,178,919
[45] Date of Patent: Jan. 12, 1993

[54] ELONGATE FINISHER MEMBER FOR AUTOMOTIVE VEHICLES

[75] Inventors: Hirotoshi Mimura; Yukie Abe; Tatsuya Tamura; Tetsuo Hotta, all of Yokohama, Japan

[73] Assignee: Hashimoto Forming Industry Co., Ltd., Japan

[21] Appl. No.: 575,365

[22] Filed: Aug. 30, 1990

[30] Foreign Application Priority Data

Aug. 31, 1989 [JP] Japan .............................. 1-101967[U]
Aug. 31, 1989 [JP] Japan .............................. 1-101968[U]
Aug. 31, 1989 [JP] Japan .............................. 1-101969[U]

[51] Int. Cl.⁵ ..................... B60J 10/02; B60R 13/04
[52] U.S. Cl. .................................. 428/31; 52/716.6; 296/93
[58] Field of Search ............... 428/31, 122, 358; 296/93; 52/716

[56] References Cited

U.S. PATENT DOCUMENTS

| | | | |
|---|---|---|---|
| 1,793,297 | 2/1931 | Zimmers | 296/135 |
| 1,884,440 | 10/1932 | Welch | 296/135 |
| 3,448,550 | 6/1969 | Herr et al. | 428/31 X |
| 4,308,704 | 1/1982 | Lloyd | 428/31 X |
| 4,401,701 | 8/1983 | Wolters | 428/31 |
| 4,491,614 | 1/1985 | Wolters | 428/133 X |
| 4,869,937 | 9/1989 | Nagata et al. | 428/31 |

FOREIGN PATENT DOCUMENTS

1280062 10/1968 Fed. Rep. of Germany .
63-201820 12/1988 Japan .

Primary Examiner—Henry F. Epstein
Attorney, Agent, or Firm—Stevens, Davis, Miller & Mosher

[57] ABSTRACT

An elongate finisher member for automotive vehicles or the like, such as a lower window molding member, includes an elongate main body of predetermined length and cross-section. The main body has a mount portion with openings for passing fasteners to secure the finisher member to a vehicle body. The finisher member further includes a flap element which extends longitudinally along the main body. The flap element has a first end region integrally connected to the main body, and a second end region which is movable between an open position and a closed position. In the open position of the second end region, the flap element maintains the openings in the mount portion accessible from outside to facilitate insertion of fasteners into the openings. In the closed position of the second end region, the flap element covers the mount portion and maintains the openings and fasteners invisible from outside to provide a refined appearance.

5 Claims, 6 Drawing Sheets

FIG_1

FIG_2

FIG_8

FIG_9

FIG_10

FIG_11

FIG_12

FIG_16

FIG_17

FIG_18

ELONGATE FINISHER MEMBER FOR AUTOMOTIVE VEHICLES

BACKGROUND OF THE INVENTION

1. Field of the Invention

The present invention relates to an elongate finisher member for automotive vehicles or the like, such as a lower window molding member along the lower edge of a rear window of the vehicle, or a scuffing plate along an opening edge of a door, which is secured to the vehicle body panel by tapping screws and the like fasteners.

2. Description of the Related Art

Conventionally, various kinds of elongate finisher members for automotive vehicles or the like are known and actually used. As one example, Japanese Utility Model Application Laid-open Publication No. 63-201,820 discloses a window molding member which is arranged along the lower edge of a rear window of the vehicle and secured to the vehicle body panel so as to cover a gap between the rear window and the trunk room panel. To this end, the known molding member includes an elongate main body of a relatively rigid material, such as a metal sheet, which is formed into predetermined length and cross-section. The main body provides a mount portion for securing the molding member to the vehicle body panel by means of bolts or the like fasteners, which are passed through openings formed in the mounting portion. The molding member is provided with a cover portion extending from the main body to cover the mount portion inclusive of the fasteners, and a lip portion of plasticized synthetic resin arranged along the edge of the main body to be brought into abutment with the surface of the rear window.

When the molding member of the abovementioned arrangement is mounted in place and secured to a vehicle body panel, the molding member serves to provide an improved appearance of the rear window along its lower edge by covering the gap between the rear window and the trunk compartment panel, though it can be secured to the vehicle body panel only with troublesome and time-consuming manual operations. More particularly, since the fasteners and the mount portion of the molding member are covered by the cover portion, it is not readily possible to use tapping screws as the fasteners which can be inserted into the openings in the mount portion and then driven from outside to realize improved work efficiency. Instead, it is necessary to previously insert fastening bolts into the openings in the mount portion such that their heads are covered by the cover portion, and engage the bolts with respective nuts from inside of the vehicle body panel when securing the molding member to the vehicle body panel. This means that very delicate tool manipulations have to be carried out in a narrow inner space of the vehicle body, which makes it difficult or almost impossible to realize an improved efficiency in the assembly. The cover portion could be omitted from the molding member, though such omission results in deterioration of the appearance as the fastener heads are directly exposed and/or visible from outside.

SUMMARY OF THE INVENTION

It is therefore a principal object of the present invention to provide an improved elongate finisher member which is capable of eliminating the drawbacks of the abovementioned conventional arrangement, and adapted to be secured to the vehicle body by using tapping screws or the like fasteners which are readily accessible from outside without particular difficulties in manipulating a work tool for driving the fasteners, and maintained invisible from outside after the finisher member has been secured to the vehicle body, thereby realizing a refined appearance.

To this end, according to the present invention, there is provided an elongate finisher member for automotive vehicles or the like, which comprises: an elongate main body of predetermined length and cross-section, including a mount portion formed with openings for passing therethrough fasteners to secure the finisher member to a vehicle body; and a flap element extending longitudinally along said main body, having a first end region which is integrally connected to said main body, and a second end region which is movable between an open position where the flap element does not cover said openings in the mount portion allowing an access thereto from outside, and a closed position where the flap element cover said mount portion and maintains said openings or said fasteners invisible from outside.

The finisher member according to the present invention can be readily secured to a vehicle body in a condition in which the second end region the flap element is moved to and/or maintained in the open position where the flap element does not cover the openings in the mount portion to allow an access to the openings from outside, so that tapping screws or the like fasteners can be inserted into the openings and driven by an appropriate tool from outside with an improved efficiency, without particular restriction in the working space. Furthermore, after the finisher member has been secured to a vehicle body, the second edge region of the flap element is moved to and maintained in a closed position where the flap element covers the mount portion and maintains the openings and fasteners invisible from outside to realize a refined appearance.

DETAILED EXPLANATION OF THE PREFERRED EMBODIMENTS

The present invention will now be explained in further detail by referring to some preferred embodiment shown in the drawings.

Figure 1:
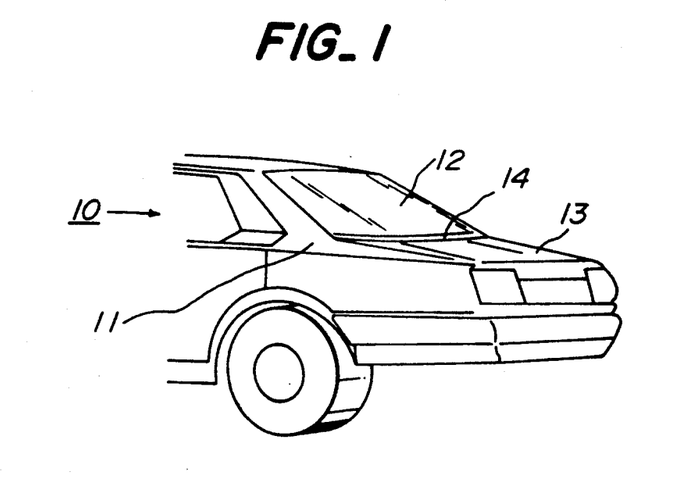
FIG. 1 is a perspective view showing an automotive vehicle equipped with a window molding member according to the present invention.

There is shown in FIG. 1 one example of an automotive vehicle to which the present invention is applied. The vehicle is designated as a whole by reference numeral 10, and includes a vehicle body 11, a rear window 12, a trunk lid 13 and an elongate finisher member according to the present invention which is in the form of a lower molding member 14 arranged along the lower edge of the rear window 12 to cover a gap between the rear window 12 and the trunk lid 13.

Figure 2:
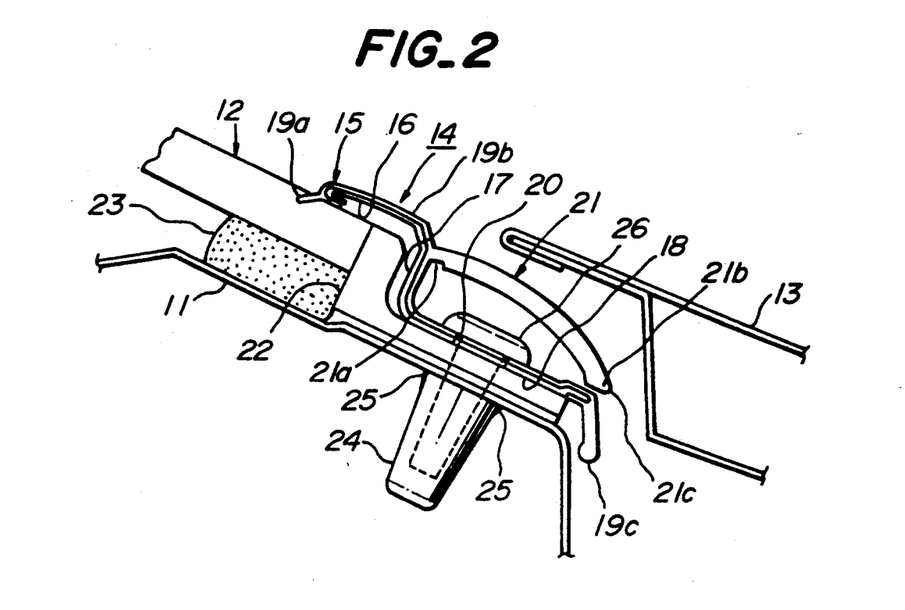
FIG. 2 is a schematic view showing the window molding member according to one preferred embodiment of the present invention, with the flap element maintained in its closed position.

As particularly shown in FIG. 2, the molding member 14 includes a rigid and elongate profiled main body 15 of predetermined length and cross-section, which is composed of an appropriate material, such as an aluminum or stainless steel sheet subjected to roll forming process, or an extruded hard synthetic resin. The main body 15 includes an edge portion 16 arranged spaced from and in parallel with the vehicle body panel 11 so as to cover the lower edge of the window plate 12, an upright portion 17 extending from the edge portion 16 toward the vehicle body panel 11, and a mount portion 18 extending from the shoulder portion 17 and arranged close to and in parallel with the vehicle body panel 11 where the molding member 14 is secured to the vehicle body panel 11.

The edge portion 16 has a free end region which is provided with a relatively flexible lip section 19a to be brought into abutment with the outer surface of the window plate 12 on its lower edge. The lip section 19a is composed of appropriate synthetic resin, such as PVC-, EVA- or PE-resin, which is arranged partly on the rear surface of the edge portion 16. The outer surface of the main body 15 is formed with a cover layer 19b of appropriate synthetic resin which may also be PVC-, EVA- or PE-resin. The mount portion 18 has a free end region which is provided with another lip section 19c extending downwardly and obliquely to cover a gap between the mount portion 18 and the vehicle body panel 11.

The mount portion 18 inclusive of the cover layer 19b is formed with a plurality of openings 20 which are spaced from each other and arranged in the longitudinal direction of the main body 15. As will be explained hereinafter, these openings 20 serve to pass therethrough fasteners for securing the molding member 14 to the vehicle body panel 11, such as tapping screws.

The molding member 14 is further integrally provided with a flexible flap element 21 which is adapted to cover the mount portion 18 of the main body 15 inclusive of the openings 20. The flap element 21 is composed of appropriate synthetic resin which may also be PVC-, EVA- or PE-resin, and includes a base end region 21a with a reduced thickness which is connected to the main body 15 near a junction between the edge portion 16 and the upright portion 17 thereof, and a free end region 21b which may be situated near the free end region of the mount portion 18. The free end region 21b of the flap element 21 may have a tip end in the form of a projection 21c which protrudes beyond the free end region of the mount portion 18 to facilitate manual handling of the flap element 21. The base end region 21a of the flap element 21 connected to the main body 15 and having a reduced thickness functions as a hinge about which the free end region 21b of the flap element 21 is movable between a closed position shown in FIG. 2 and an open position shown in FIG. 3.

For the purpose of example only, it is assumed that the lower edge of the rear window plate 12 is positioned with reference to the vehicle body panel 11 by means of stoppers 22 composed of an appropriate synthetic resin with desired elasticity and hardness, and is adhered on its rear surface to the vehicle body panel 11 by means of an adhesive agent 23. It is further assumed that each stopper 22 is integrally provided with a grommet 24 to be inserted into the openings 24, and secured to the outer surface of the vehicle body panel 11 and is supported by the grommet 24. The grommets 24 are passed through respective openings in the vehicle body panel 11, and prevented from withdrawal and retained in place by projections 25 engaging with the rear surface of the panel 11.

The molding member 14 is secured to the vehicle body panel 11 in the following manner. First of all, after the window plate 12 together with the adhesive agent 23 has been positioned in place, the molding member 14 is positioned into a predetermined location with the lip section 19a on the edge portion 16 of the main body 15 in abutment with the outer surface of the window plate 12 on its lower edge, and the mount portion 18 of the main body 15 positioned close to the outer surface of the vehicle body panel 11 with the stoppers 22 therebetween. The free edge region 21b of the flap element 21 is manually moved to and maintained in the open position shown in FIG. 3, wherein tapping screws or the like fasteners 26 can be readily inserted into the grommets 24 and accessed and/or driven from outside without difficulties. Thus, by driving the fasteners 26 into the grommets 24, it is readily possible to secure the molding member 14 to the vehicle body panel 11 with a considerably improved efficiency.

Figure 3:
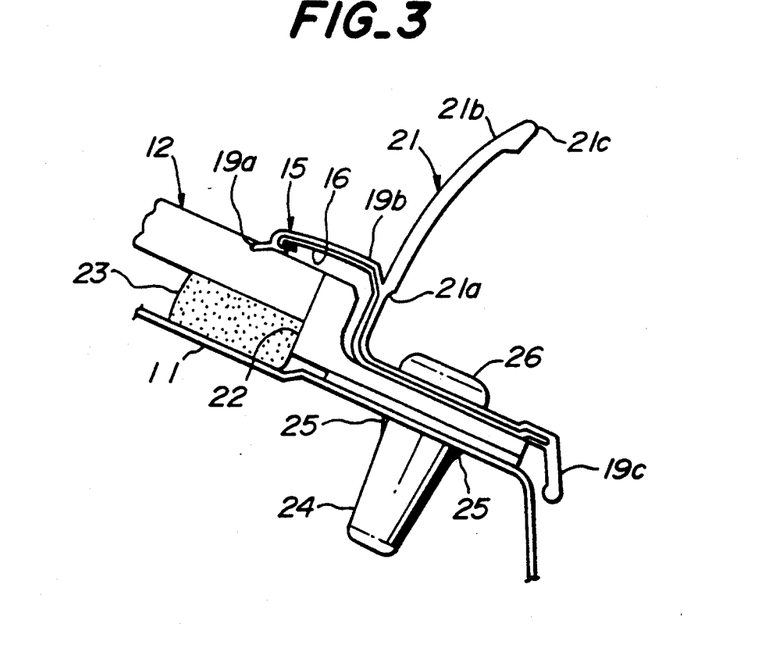
FIG. 3 is a schematic view showing the window molding member of FIG. 2 with the flap element maintained in its open position.

After the molding member 14 has been secured to the vehicle body panel 11, the free edge region 21b of the flap element 21 is released from the open position shown in FIG. 3. Thus, the free edge region 21b restores to the closed position shown in FIG. 2 by its own resiliency, and the flap element 21 covers the mount portion 18 of the main body 15 to visually conceal the fasteners 26 and the grommets 24 and provide a refined appearance.

Figure 4:
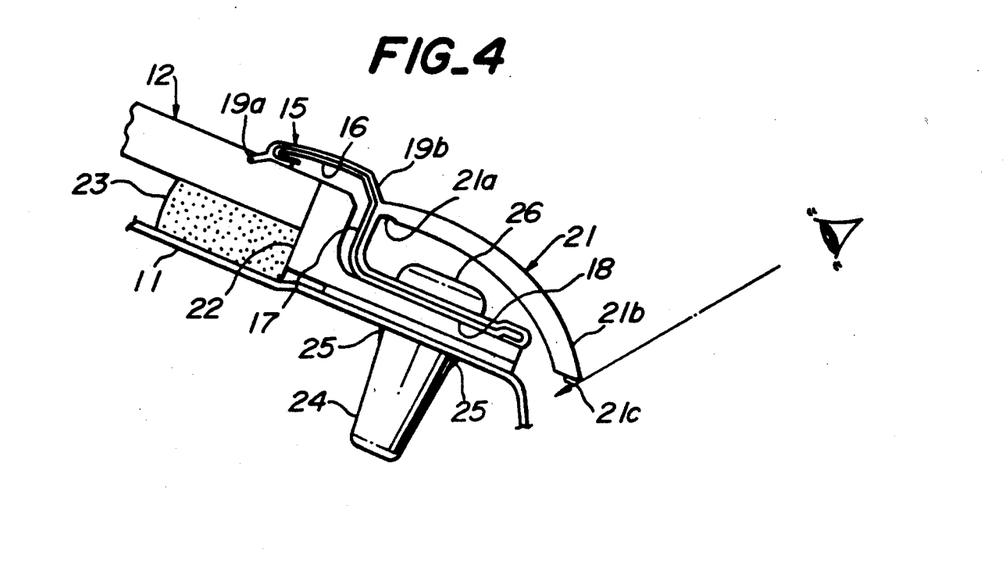
FIG. 4 is a schematic view similar to FIG. 2, showing the window molding member according to a modified embodiment of the present invention.

There is shown in FIG. 4 a modified embodiment wherein the free edge region 21b of the flap element 21 extends beyond the free end region of the mount portion 18 to cover the gap between the mount portion 18 and the vehicle body panel 11. In this case, it is not necessary to provide the mount portion 18 with the lip section 19c.

Figure 5:
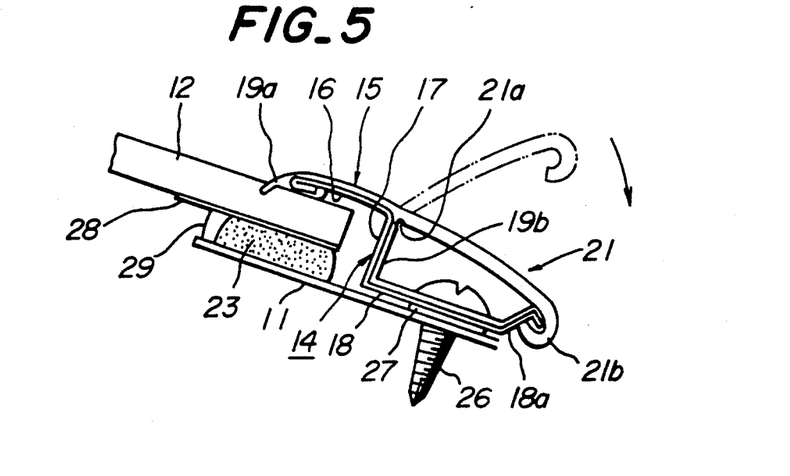
FIG. 5 is a cross-sectional view similar to FIG. 3, showing the window molding member according to another embodiment of the present invention.
Figure 6:
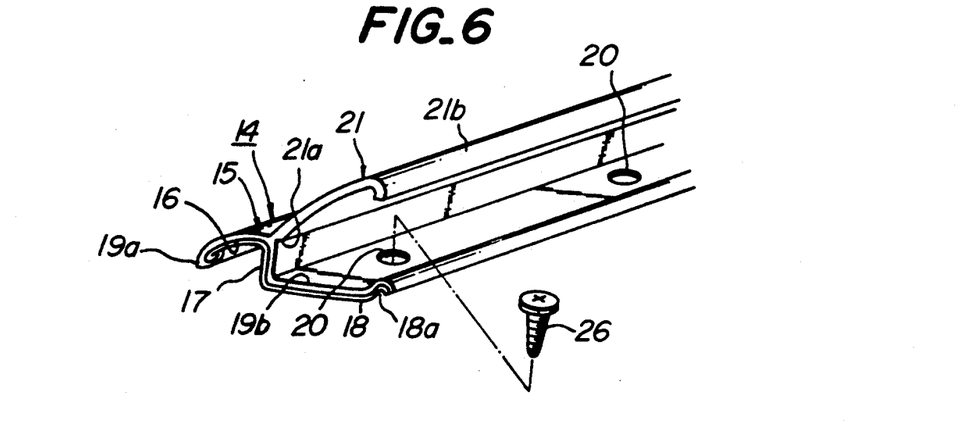
FIG. 6 is a perspective view of the window molding member shown in FIG. 5.

Another embodiment of the present invention is shown in FIGS. 5 and 6, wherein the flap element 21 is formed such that, in the free state of the flap element 21, the free end region 21b is maintained in its open position by the resiliency of the flap element 21 itself as shown by imaginary line in FIG. 5. Moreover, the free end region 21b has a tip end which is bent back toward the base edge region 21a of the flap element 21, while the mount portion 18 of the main body 15 has a free end region 18a which is bent upwardly so as to be engageable with the free end region 21b of the flap element 21 to retain the latter in its closed position as shown by solid line in FIG. 5, and disengageable therefrom to allow a resilient restoration of the flap element 21 to its open position.

The molding member 14 according to the embodiment shown in FIGS. 5 and 6 can be secured to the vehicle body panel 11 in substantially the same manner as in the previous embodiments, with the flap element 21 maintained in its open position and tapping screws or the like fasteners 26 driven directly into the vehicle body panel 11 through the openings 20 in the mount portion 18. In this connection, for each of the fasteners 26, an annular washers 27 composed of soft synthetic resin is preferably arranged between the vehicle body panel 11 and the mount portion 18 of the molding member 14.

After the molding member 14 has been secured to the vehicle body panel 11, the flap element 21 is moved to its closed position and retained therein by the engagement of the free end region 21b of the flap element 21 and the free end region of the mount portion 18. Thus, the flap element 21 covers the mount portion 18 of the main body 15 to visually conceal the fasteners 26 and provide a refined appearance.

Incidentally, the window plate 12 is shown in FIG. 5 as being provided on the periphery of its inner surface with an opaque printed layer 28 and a dam rubber 29, and secured to the vehicle body panel 11 by an adhesive agent 23.

Figure 7:
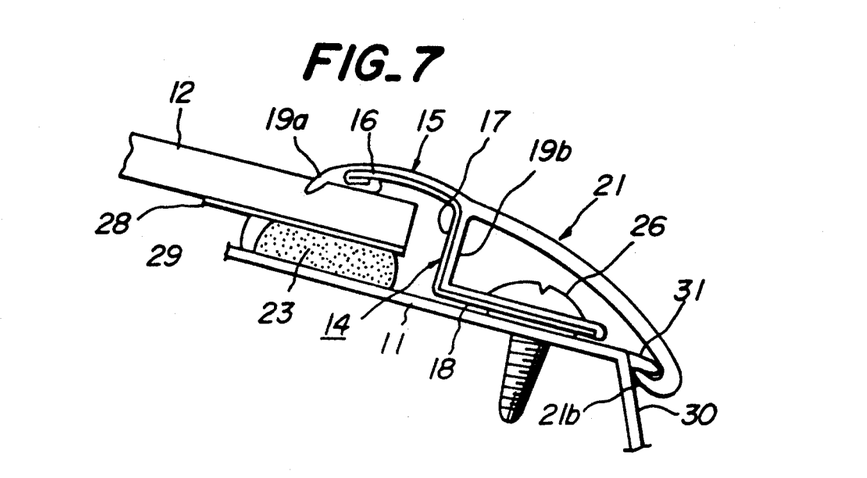
FIG. 7 is a cross-sectional view showing the window molding member according to another modified embodiment of the present invention.

There is shown in FIG. 7 a modified embodiment wherein the vehicle body panel 11 has a downwardly inclined surface 30 extending toward the trunk compartment panel (not shown) and provided with a retaining projection 31 for retaining the flap element 21 in its closed position. Thus, the free end region 21b of the flap element 21 is engageable with, and disengageable from the retaining projection 31. The retaining projection 31 may be composed of a relatively hard material formed into a rigid configuration and integrally connected to the inclined surface 30 of the vehicle body panel 11.

Further modifications to the embodiment shown in FIGS. 5 and 6 will be explained below with reference to FIGS. 8 to 13.

Figure 8:
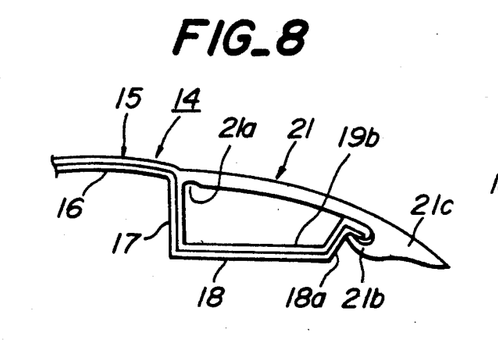
FIGS. 8 and 9 are cross-sectional views showing the window molding member according to still another modified embodiment of the present invention, respectively.
Figure 9:
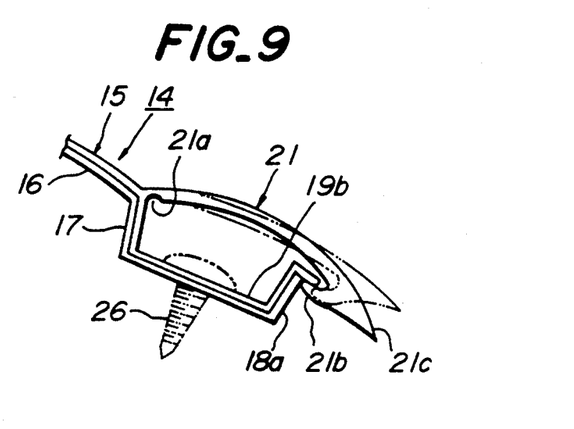

In the modification shown in FIG. 8, the free end portion 21b of the flap element 21 is engageable with and disengageable from the free end region 18a of the mount portion 18, and is formed with a lip section 21c which extends beyond the free end region of the mount portion 18 to cover the gap between the mount portion 18 and the vehicle body panel 11 while facilitating the handling of the flap element 21 as in the embodiment shown in FIG. 4. In this case, the arrangement may be such that the flap element 21 as a whole, inclusive of the lip section 21c, is composed of a relatively soft and flexible synthetic resin while the cover layer 19b on the outer surface of the main body 15 is composed of a relatively hard and rigid synthetic resin.

Alternatively, the flap element 21 composed as a whole of a relatively hard and rigid synthetic resin may be combined with the main body 15 including the cover layer 19b of a relatively soft and flexible synthetic resin. In this case, the flap element 21 may have a predetermined cross-sectional shape with substantial radius of curvature such that it ca be temporarily subjected to a straightening deformation when pressed downwardly, before the free end region 21b reaches the closed position. During such deformation, as shown by imaginary line in FIG. 9, the free end region 21b of the flap element 21 is moved in a direction away from the free end region 18a of the mount portion 18, to facilitate engagement of the two end regions 21b and 18a with each other.

Figure 10:
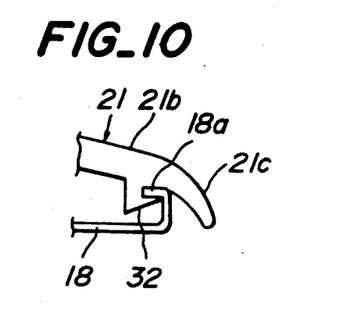
FIGS. 10 to 15 are schematic views showing various modifications according to the present invention.

According to another modification shown in FIG. 10, the free end region 18a of the mount portion 18 is bent back toward the edge portion 16, while the flap element 21 in its free end region 21b is provided with a continuous anchoring edge 32 which is arranged on the inner side of the free end region 18a of the mount portion 18 so as to be engageable therewith.

Figure 11:
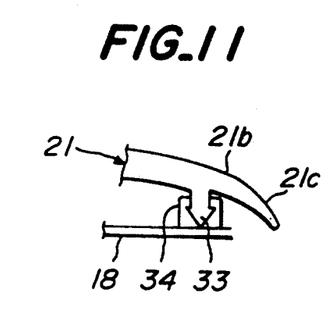
Figure 12:
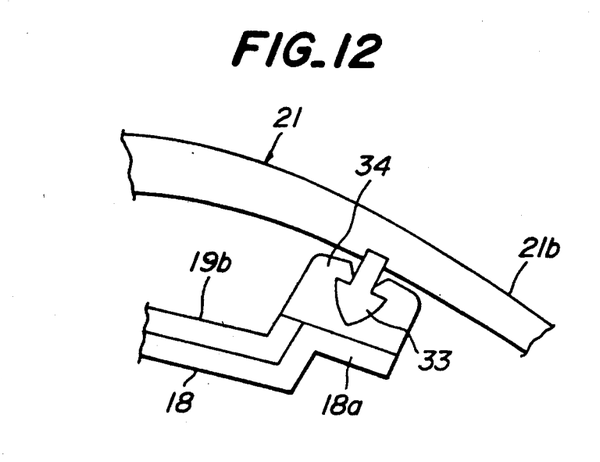

The anchoring edge 32 may be replaced by a plurality of anchoring projections 33 as shown in FIGS. 11 or 12, which are spaced from each other in the longitudinal direction of the molding member 14 and composed of an appropriate hard synthetic resin, such as polyvinylchloride or polyimide resin. On the other hand, the free end region 18a of the mount portion 18 may be provided with fasteners 34 which are engageable with the respective projections 33 and composed of synthetic resin with excellent anti-creep characteristic, such as nylon, polyamide or polyacetal resin.

Figure 13:
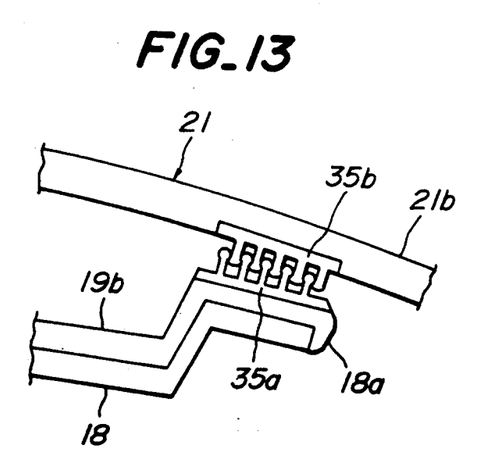

Furthermore, as shown in FIG. 13, the free end regions 18a, 21b of the mount portion 18 and the flap element 21 may respectively be provided with so-called surface fasteners 35a, 35b which are arranged opposite to and engageable with each other to retain the flap element 21 in its closed position.

In the previous embodiments, the flap element 21 includes an inner end region 21a which is close to the edge portion 16 of the main body 15 and integrally connected to the main body 15, and an outer end region 21b which is remote from the edge portion 16 of the main body 15 and movable between the closed position and open position, although this is not a prerequisite condition.

Figure 14:
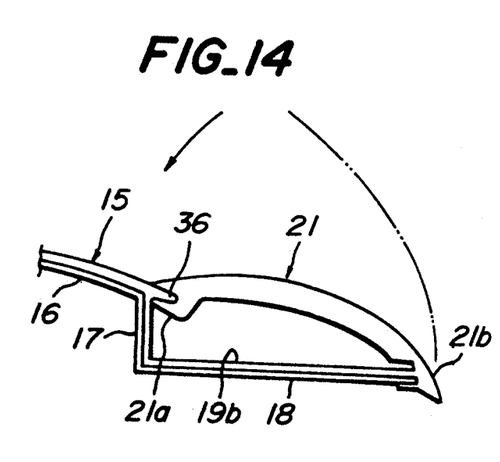

Thus, as shown in FIG. 14, the flap element 21 may include an outer end region 21b which is integrally connected to the main body 15, and an inner end region 21a which, in turn, is movable between the closed position and open position. In this case, the main body 15 at its junction between the edge portion 16 and the upright portion 17 may be provided with a retaining projection 36, while forming the inner end region 21a of the flap element 21 into a bifurcated configuration so as to be engageable with and disengageable from the retaining projection 36.

Figure 15:
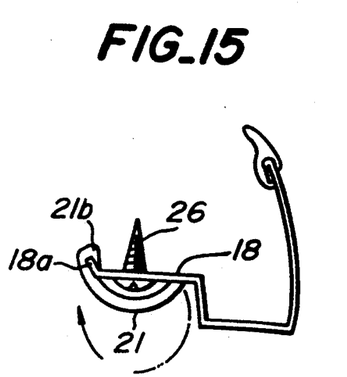

The present invention may also be applied to a drip molding member as shown in FIG. 15, which is to be secured to a roof flange of an automotive vehicle, not shown. In this case, the flap element 21 may be adapted to cover the mount portion 18 from the lower side thereof to conceal the fasteners 26 to provide a refined appearance. To this end, the flap element 21 may include an inner end region 21a which is integrally connected to the mount portion 18, and an outer end region 21b which is engageable with and disengageable from the free end region 18a of the mount portion 18.

Figure 17:
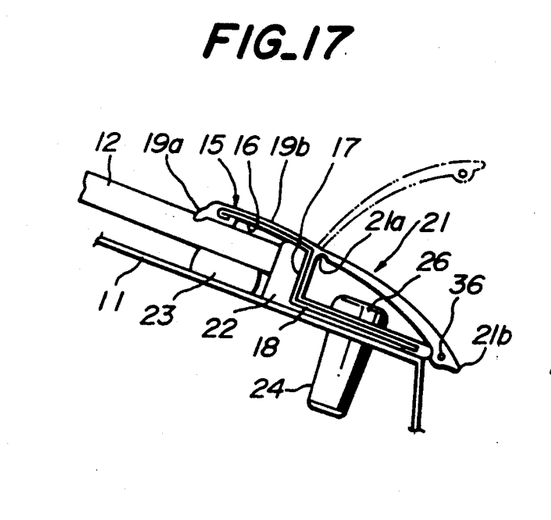
FIGS. 17 and 18 are cross-sectional views of the window molding member shown in FIG. 16.
Figure 18:
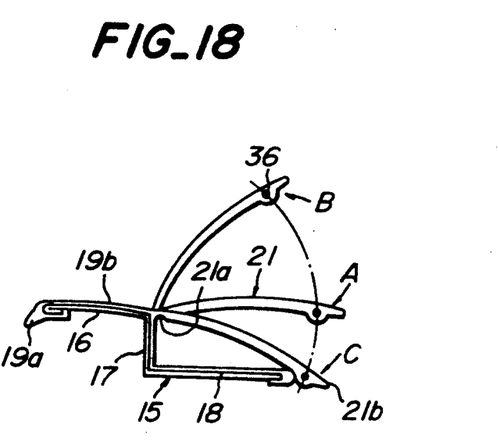

Still another embodiment of the lower molding member 14 according to the present invention will be explained below with reference to FIGS. 16 to 18. In this embodiment, the molding member 14 includes a bistable flap element 21 which is movable between two stable positions, i.e. an open position shown by broken line in FIG. 17, and a closed position of the flap element 21 shown by solid line in FIG. 17.

Figure 16:
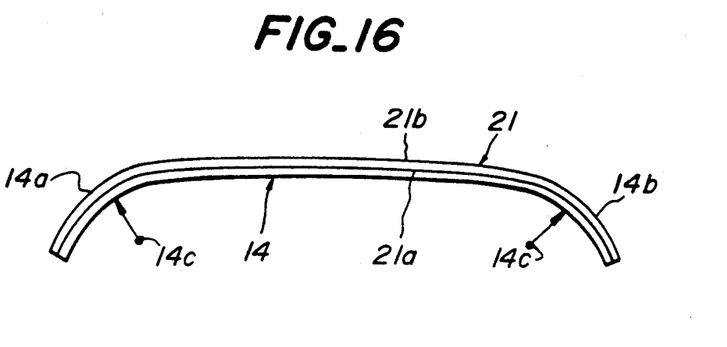
FIG. 16 is a plan view showing the window molding member according to still another embodiment of the present invention.

To this end, for example, the main body 15 of the molding member 14 as a whole, including the flap element 21, has been subjected to an axial bending to have a curvature about a predetermined bending axes 14c which corresponds to the curvature along the lower edge of the rear window 12, as particularly shown in FIG. 16. Thus, the molding member 14 includes two side regions 14a, 14b of a relatively small radius of curvature, and a center region 14c of a relatively large radius of curvature. The abovementioned bending axis is substantially at right angle to a plane including the mount portion 18 of the main body 15, and is intersected by a line passing through both end regions 21a, 21b of the flap element 21 so that the inner end region 21a and the outer end region 21b are respectively arranged on radially inner and outer sides with reference to the bending axis. This means that the free end region 21b of the flap element 21 is always subjected to a higher tensile stress as compared with the base end region 21a thereof.

Furthermore, as compared with a single stable position A of the flap element 21 without being subjected to the axial bending, the free end region 21b of the flap element 21 according to the present embodiment is situated closer to the center of curvature in the stable open position B, and closer to the free end region 18a of the mount portion 18 in the stable closed position C, due to the tendency to relieve the tensile stress as a result of the axial bending. Thus, the movement of the free end region 21b of the flap element 21 between the open position B and closed position C includes a first phase in which the flap element 21 is applied with an incremental tensile stress until the free end region 21b reaches a position where it is applied with maximum tensile stress, and a subsequent second phase in which the flap element 21 exhibits a tendency to relieve the tensile stress.

As in the previous embodiments, the molding member 14 is secured to the vehicle body panel 11 in the stable open position B of the flap element 21. Thereafter, the free end region 21b of the flat element 21 is urged downwardly toward the closed position C. During this movement, as the free end region 21b reaches the maximum tensile stress position, the flap element 21 undergoes a so-called snap action and is automatically moved to the closed position C in which the free end region 21b of the flap element 21 is maintained in contact with the free end region 18a of the mount portion 18 to cover the latter to gather with the fasteners 26 and provide a refined appearance.

In order to realize a satisfactory snap action of the flap element 21, it is preferable for the free end region 21b of the flap element 21 to have an elongation to unit tensile force, which is lower than elongation to unit tensile force of the base end region 21a. This can be achieved, for example, by an increased thickness of the flap element 21 at the free end region 21b, and/or by embedding into the free end region 21b of the flap element 21 a flexible core element 36 with a relatively low elongation, such as glass fiber strand, and/or by forming the free end region 21b from a relatively hard synthetic resin with a relatively low elongation as compared with remaining regions of the flap element 21.

It will be readily appreciated from the foregoing detailed description that the present invention provides an improved elongate finisher member adapted to be secured to the vehicle body by using tapping screws or the like fasteners which are readily accessible from outside without particular difficulties in manipulating a work tool for driving the fasteners, and maintained invisible from outside after the finisher member has been secured to the vehicle body, thereby realizing a refined appearance.

The present invention is not limited to the illustrated embodiments, which were presented by way of examples only, and a number of variations or modifications can be made without departing from the scope of the invention.

What is claimed is:

1. An elongate finisher member for automotive vehicles, comprising:
   an elongate main body of predetermined length and cross-section, including a mount portion formed with openings for passing therethrough fasteners to secure the finisher member to a vehicle body; and
   a flap element extending longitudinally along said main body, having a first end region which is integrally connected to said main body and a second end region which is movable between an open position where the flap element maintains said openings in the mount portion accessible from outside, and a closed position where the flap element covers said mount portion and maintains said openings invisible from outside, said flap element being of a bistable structure having one stable position which corresponds to said open position of said second end region of the flap element, and another stable position which corresponds to said closed position of said second end region of the flap element, said bistable structure being formed by said main body being subjected to an axial bending about a predetermined bending axis intersected by a line passing through said first and second end regions of said flap element, such that said first and second end regions are respectively arranged on radially inner and outer sides with reference to said bending axis whereby, during the movement of said second end region between said open position and said closed position, said second end region passes a position where it is subjected to maximum tensile stress.

2. The finisher member as set forth in claim 1, wherein said second end region of said flap element has an elongation to unit tensile force, which is lower than elongation to unit tensile force of said first end region.

3. The finisher member as set forth in claim 2, wherein said second end region of said flap element has a thickness which is greater than that of said first end region.

4. The finisher member as set forth in claim 2, wherein said second end region of said flap element is provided with a flexible core element of poor elongation to unit tensile force, said core element being embedded in said second end region.

5. The finisher member as set forth in claim 2, wherein said second end region is formed of a material with increased hardness and poor elongation to unit tensile force, as compared with remainder of said flap element.

* * * * *

UNITED STATES PATENT AND TRADEMARK OFFICE
CERTIFICATE OF CORRECTION

PATENT NO.   :   5,178,919

DATED        :   January 12, 1993

INVENTOR(S)  :   Hirotoshi MIMURA et al

It is certified that error appears in the above-identified patent and that said Letters Patent is hereby corrected as shown below:

Title page, item [75] Inventor:  "should read as follows:
--Tatsuya Tamura; Tetwuo Hotta; both of Yokohama, Japan--

Signed and Sealed this

Twenty-second Day of March, 1994

*Attest:*

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,178,919
DATED     : January 12, 1993
INVENTOR(S) : Hirotoshi MIMURA et al It is certified that error appears in the above-identified patent and that said Letters Patent is hereby corrected as shown below:

Title page, item [75] Inventor:  should read as follows:

-- Tatsuya Tamura; Tetsuo Hotta; both of Yokohama, Japan --

This certificate supersedes Certificate of Correction issued March 22, 1994.

Signed and Sealed this

Eighteenth Day of October, 1994

Attest:

BRUCE LEHMAN

Attesting Officer

Commissioner of Patents and Trademarks